US007140467B2

(12) United States Patent
Cook

(10) Patent No.: US 7,140,467 B2
(45) Date of Patent: Nov. 28, 2006

(54) BULK MATERIAL TRANSPORT VEHICLE ACCESS STRUCTURE

(76) Inventor: Anthony Jay Cook, 3824 Claymont Ct., Florence, SC (US) 29501

( * ) Notice: Subject to any disclaimer, the term of this patent is extended or adjusted under 35 U.S.C. 154(b) by 309 days.

(21) Appl. No.: 10/835,120

(22) Filed: Apr. 29, 2004

(65) Prior Publication Data

US 2005/0241878 A1 Nov. 3, 2005

(51) Int. Cl.
*E04G 1/22* (2006.01)

(52) U.S. Cl. ....................................... 182/143; 182/141

(58) Field of Classification Search ................ 182/115, 182/116, 141, 142, 144, 148, 150
See application file for complete search history.

(56) References Cited

U.S. PATENT DOCUMENTS 1,727,671 A * 9/1929 Pott ............................ 182/13
2,762,659 A * 9/1956 Harlan et al. ............... 182/141
3,451,504 A * 6/1969 Logan ........................... 182/1
3,493,079 A * 2/1970 Dudschus ................... 182/141
3,851,728 A * 12/1974 Williams ..................... 182/17
3,880,256 A * 4/1975 Couris ......................... 182/136
4,171,033 A * 10/1979 Rust et al. ................. 182/69.6
4,222,140 A * 9/1980 Olewinski et al. ........... 14/71.3
4,421,209 A * 12/1983 Vermette et al. ............ 187/235
4,776,429 A * 10/1988 Osborn ....................... 182/144
4,962,828 A * 10/1990 Duncan ....................... 182/82
5,027,922 A * 7/1991 Benko et al. ............... 182/113
5,042,612 A 8/1991 Bennett et al. ................ 182/1
5,392,878 A 2/1995 Bennett et al. ............. 182/115
5,555,952 A * 9/1996 van Mol et al. .............. 182/18
5,555,953 A * 9/1996 Henderson .................. 182/141
5,579,865 A * 12/1996 Butler et al. ................ 182/141
5,671,823 A * 9/1997 Oakes ......................... 182/36
6,234,272 B1 * 5/2001 Plentl, Jr. ................... 182/115
6,250,426 B1 * 6/2001 Lombard .................... 182/146

* cited by examiner

*Primary Examiner*—Hugh B. Thompson, II
*Assistant Examiner*—Colleen Quinn
(74) *Attorney, Agent, or Firm*—Charles L. Schwab; Nexsen Pruet, LLC

(57) ABSTRACT

A bulk material transport vehicle access structure includes an elongated service platform for workers which is pivotally supported at its opposite ends to cantilever arms on parallel horizontal axes to avoid binding between the roller carriages of the cantilever arms and a pair of support pillars. The floor of the platform includes a walkway and a doorway covered by a plurality of side by side doors which may be selectively opened. Electric controls are provided to automatically stop operation of the power means used to control the elevation of the cantilever arms should the service platform become tilted a predetermined extent. Electric controls are also provided to stop lowering of the service platform when it reaches the top of a bulk material transport vehicle.

7 Claims, 9 Drawing Sheets

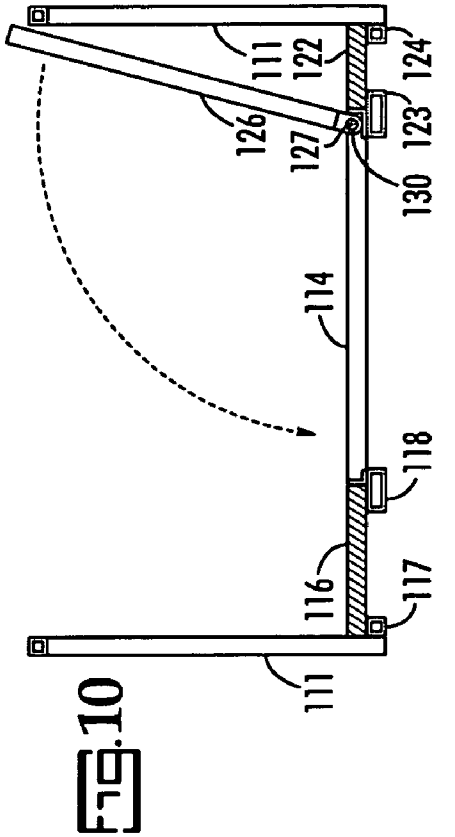
Fig. 10
Fig. 4
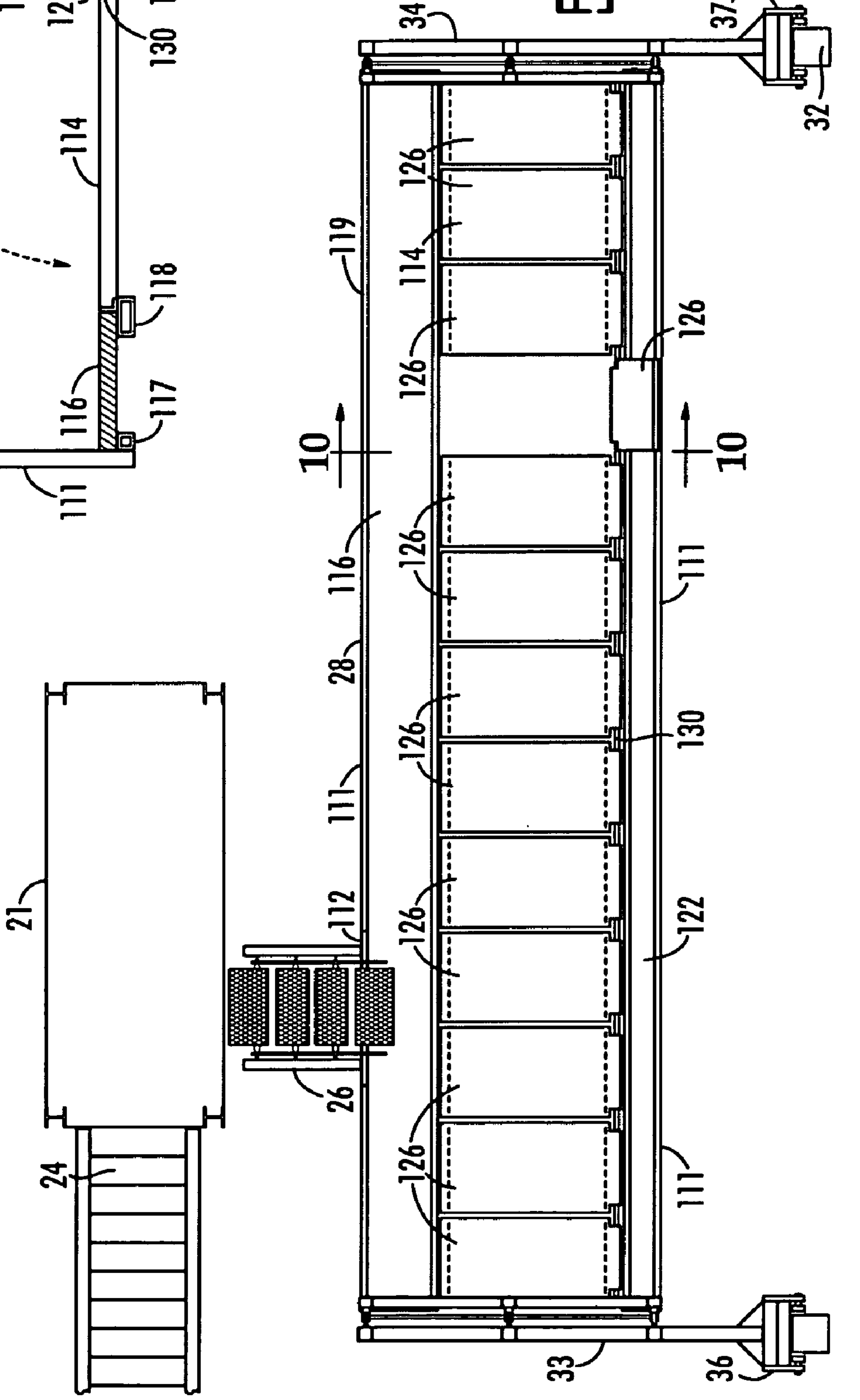

BULK MATERIAL TRANSPORT VEHICLE ACCESS STRUCTURE

BACKGROUND OF THE INVENTION

An access structure is needed to enable workmen to have access to the top of bulk material transport vehicles such as bulk material tank trucks used to transport fluid material. In one form of such an access structure, a pair of cantilever arms supporting a service platform are mounted on a pair of upright supports or pillars and are reciprocated up and down by a pair of linear acting fluid actuators. Although fluid may be supplied to the actuators by way of a flow divider, it is possible for the flow to the actuators to be slightly unequal. Thus over time one cantilever arm may be somewhat elevated relative to the other, thereby creating an unsafe, non level service platform and binding in the carriage roller connection between the cantilever arms and the upright supports. It is desired to provide structures which keep a safe inclination and avoid binding in the roller carriage connection. Prior bulk material access platforms have an elongated tank access opening extending along their entire length and a narrow walkway along one side of the elongated opening. Thus platform support for workers was provided only on one side of the opening. It has been found desirable to provide platform support for workers positioned on more than one side of the tank area being serviced.

SUMMARY OF THE INVENTION

A bulk transport vehicle access structure is provided in which an elongated worker platform is suspended above the bulk tank of the vehicle by a pair of parallel cantilever arms supported on a pair of pillars by roller carriages. The opposite ends of the elongated platform are attached to the cantilever arms on horizontal axes parallel to the elongated arms, thus preventing binding of the roller carriages on the pillars. Switches are provided to automatically prevent joint operation of linear fluid actuators employed to raise and lower the platform when the platform is out of level to a certain extent and control apparatus is provided to restore the platform to a level condition. Limit switches with lever arms are provided to stop lowering of the service platform when the lever arms contact the top of a tank of a transport vehicle. The platform is provided with a floor having a plurality of side by side hinged doors disposed along its longitudinal length. The doors may be individually opened to provide worker access to selected areas of the top of the bulk transport tank of the vehicle being serviced.

BRIEF DESCRIPTION OF THE DRAWINGS

One embodiment of the invention is illustrated in the accompanying drawings, in which:

FIG. 4 is a top view of the bulk material transport vehicle access station taken on the line 4—4 in FIG. 2;

FIG. 10 is a section taken on the line 10—10 in FIG. 4 showing one of the hinged doors of the worker platform in an open position;

DETAILED DESCRIPTION OF THE INVENTION

Figure 1:
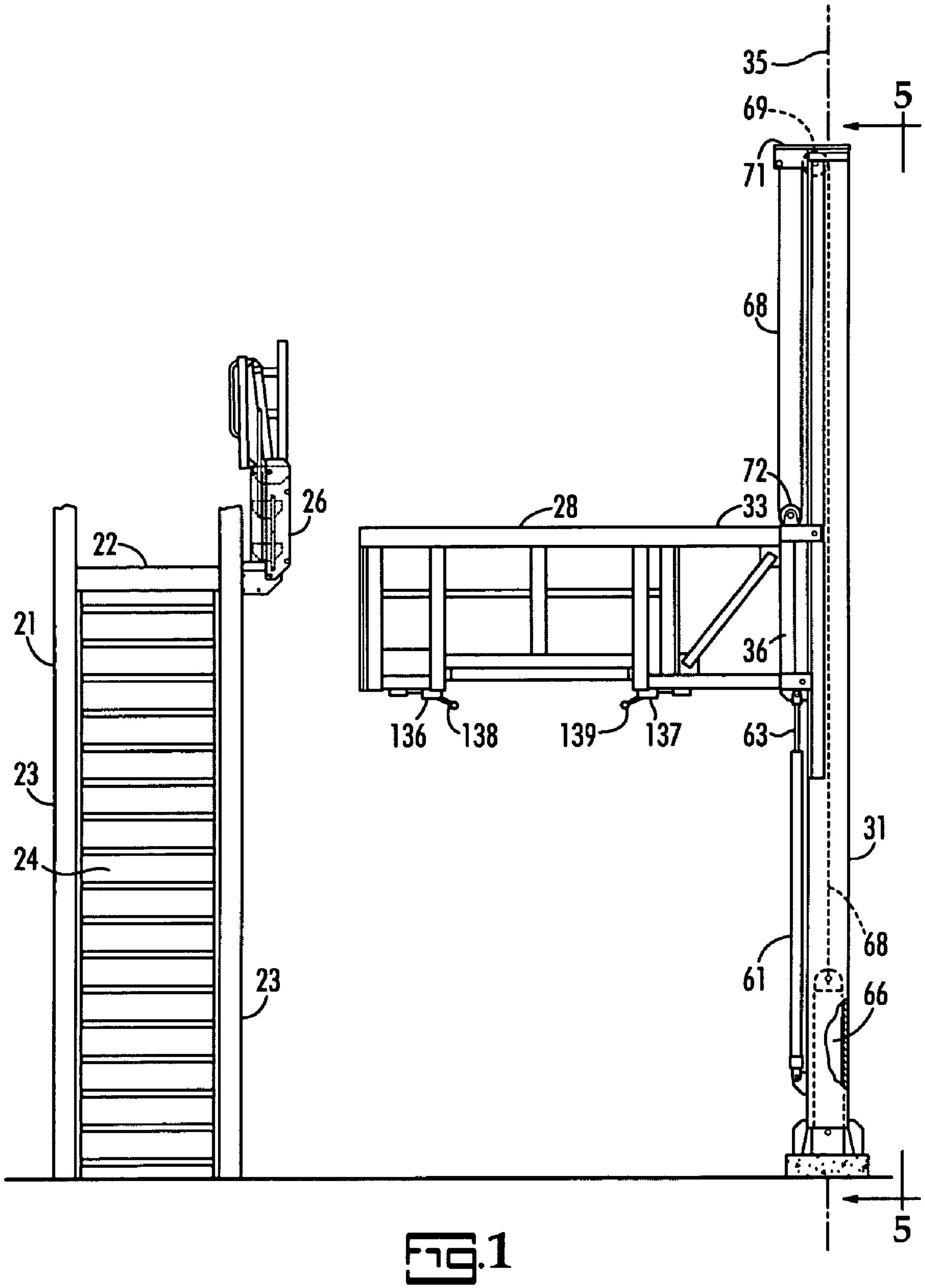
FIG. 1 is an end view of a bulk material transport vehicle access station with the worker service platform in a raised position.
Figure 2:
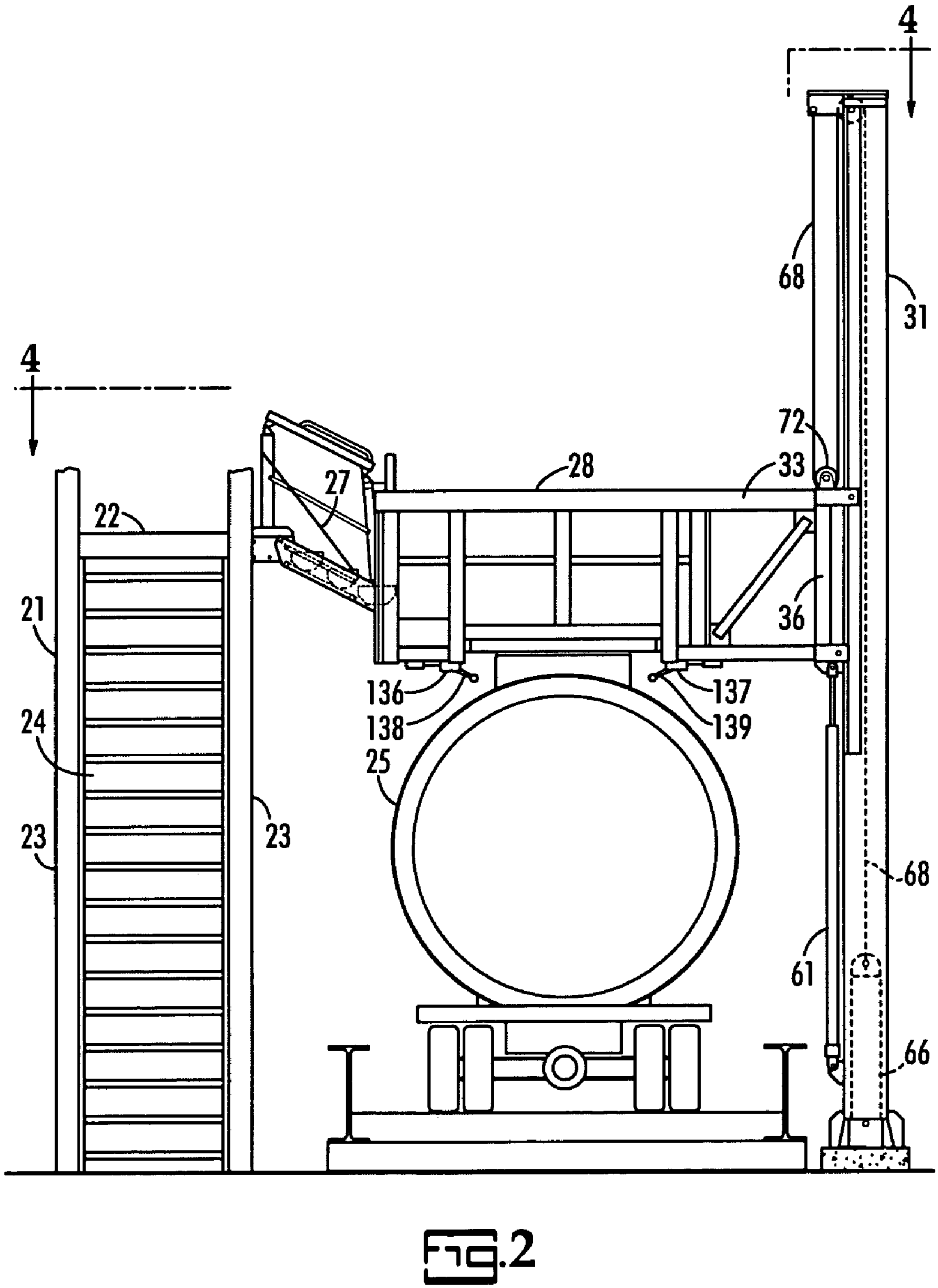
FIG. 2 is a view similar to FIG. 1 but showing the worker platform lowered to the top of the bulk tank of a low height bulk transport truck.

As shown in the drawings, an elongated stationary worker access platform 21 is provided to place workmen at the level of the top of a bulk transport vehicle or truck 25, which includes a landing having an elevated floor area or floor 22 mounted on four support posts 23, a stairway 24 to the floor 22 and a retractable stairway 26. The retractable stairway 26 has self leveling steps, is pivotally mounted on the stationary platform 21 and is shown in its retracted position in FIG. 1. As shown in FIG. 2, an adjustable chain stop 27 is provided to limit downward swinging movement of the stairway 26.

Figure 8:
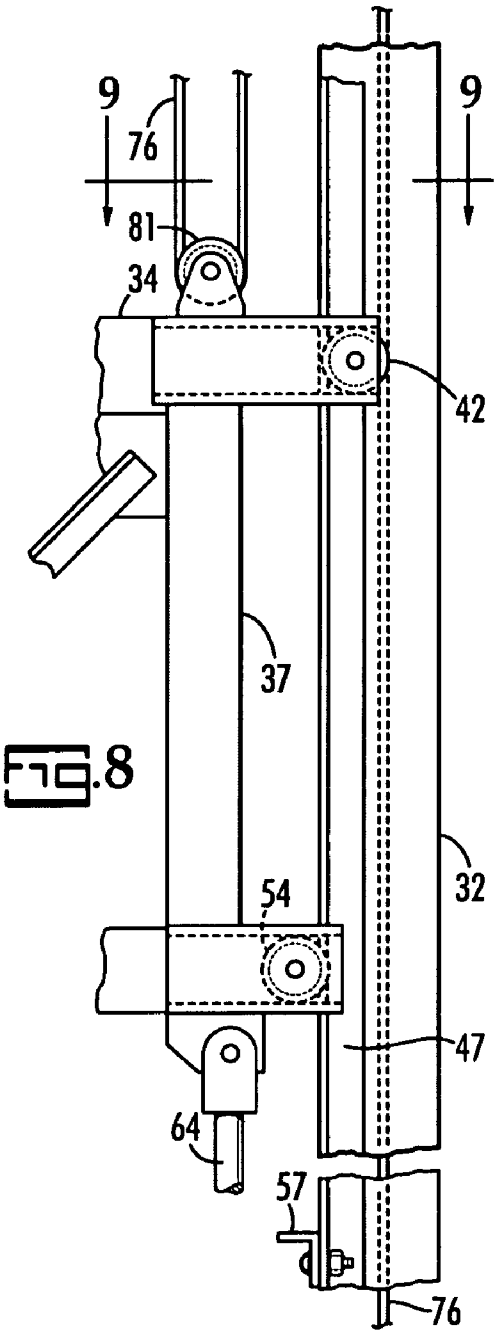
FIG. 8 is partial side view showing a cantilever arm roller carriage supported on an upright.
Figure 9:
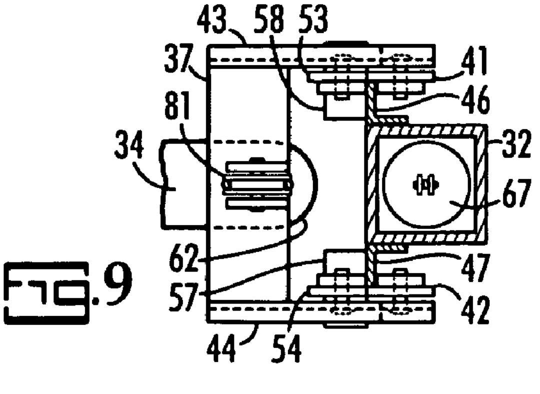
FIG. 9 is a section taken on the line 9—9 in FIG. 8.

A vertically adjustable and longitudinally extending worker platform 28, spaced laterally from and disposed in parallel relation to the stationary platform 21, is supported on a pair of upright hollow support pillars 31, 32 by a pair of cantilever arms 33, 34. The pillars 31, 32 are disposed in an upright or vertical plane 35 parallel to the elongated worker platform 28. Roller carriage structures 36, 37 on corresponding ends of the cantilever arms 33, 34 support the arms 33, 34 for vertical travel on vertical tracks 46, 47, 55, 56 on the pillars 31, 32. As shown in FIGS. 8 and 9, the roller carriage structure 37 includes upper flanged rollers 41, 42 rotatably mounted on upper channel segments 43, 44 of the carriage 37 in rolling engagement with first corresponding sides of vertical guide tracks 46, 47 and lower flanged rollers 51, 52 rotatably mounted on lower channel segments 53, 54 of the carriage 37 in rolling engagement with second or opposite corresponding sides of the tracks 46, 47 on the pillar 32. The carriage 36 and pillar 31 are constructed in the same manner to permit the cantilever arm 33 to travel vertically on its vertical tracks 55, 56. Downward movement of the cantilever arms 33, 34 is limited by stops 57, 58 on the pillar 32 and by stops 59, 60 on the pillar 31.

Figure 3:
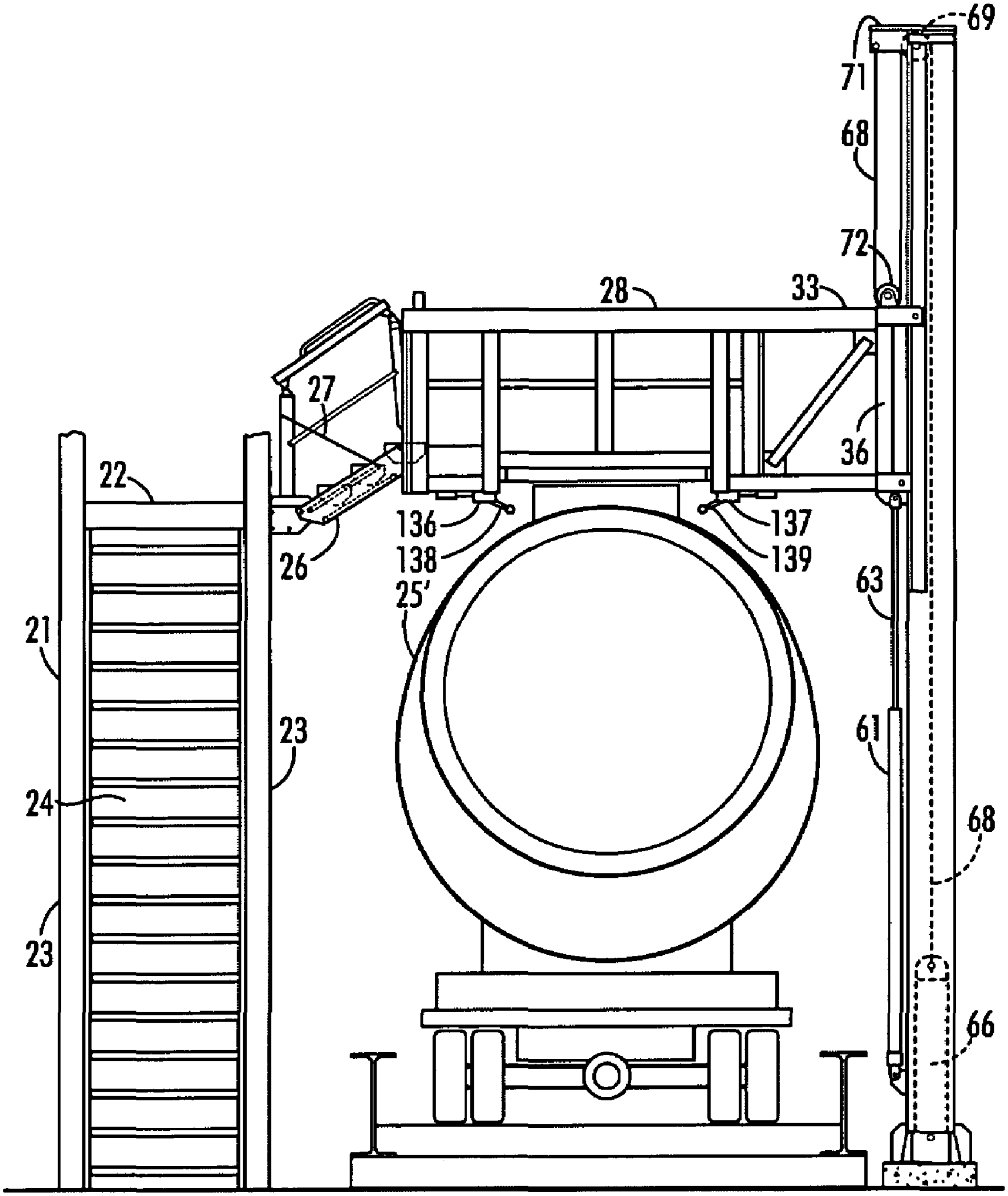
FIG. 3 is a view similar to FIG. 2 but showing the worker platform lowered to the top of a bulk tank of a relatively high bulk tank truck.

The cantilever arms 33, 34 are raised and lowered by electrically controlled power means in the form of a pair of linear fluid actuators 61, 62 having corresponding lower or cylinder ends pivotally connected to the pillars 31, 32, respectively, and upper or rod ends 63, 64 pivotally connected to the cantilever arms 33, 34, respectively. The platform 28 and actuators 61, 62 are adapted to be lowered to service a low tank truck 25, as shown in FIG. 2, or a high tank truck 25' as shown in FIG. 3. The lifting burden imposed on the actuators 61, 62 is reduced through provision of counterbalancing weights 66, 67 disposed inside the hollow pillars 31, 32. As shown in FIG. 1, the lower end of a cable 68 is secured to the weight 66 and extends upwardly and around a pulley 69 rotatably mounted on a bracket 71 on the upper end of the pillar 31, around a pulley 72 on the cantilever arm 33 and then up to the bracket 71 to which the upper end of the cable 68 is secured. This cable and pulley arrangement applies a lifting force on the arm 33 equal to twice the weight of the weight 66 and allows the actuator to be smaller in diameter than it would otherwise be required to be, assuming the same fluid pressure is used. The other weight 67 in the pillar 32 is connected to a cable 76 which is reaved in a like manner about a pulley, not shown, at the top of the pillar 32 and then around a pulley 81 on the cantilever arm 34 and then up to the top of the pillar 32 to which it is securely fastened.

Figure 5:
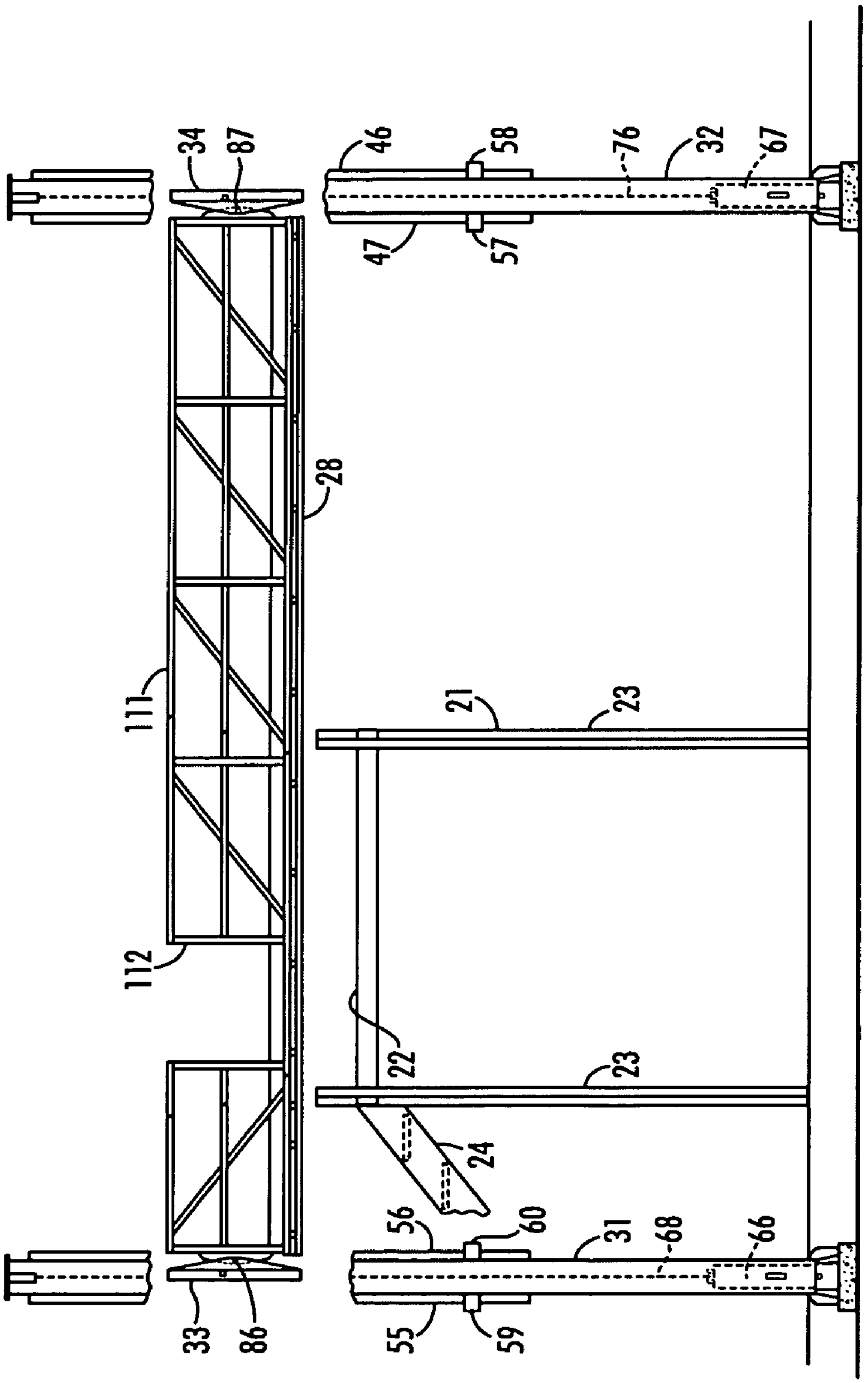
FIG. 5 is a side view taken on the line 5—5 in FIG. 1 with parts broken away for illustration purposes.
Figure 6:
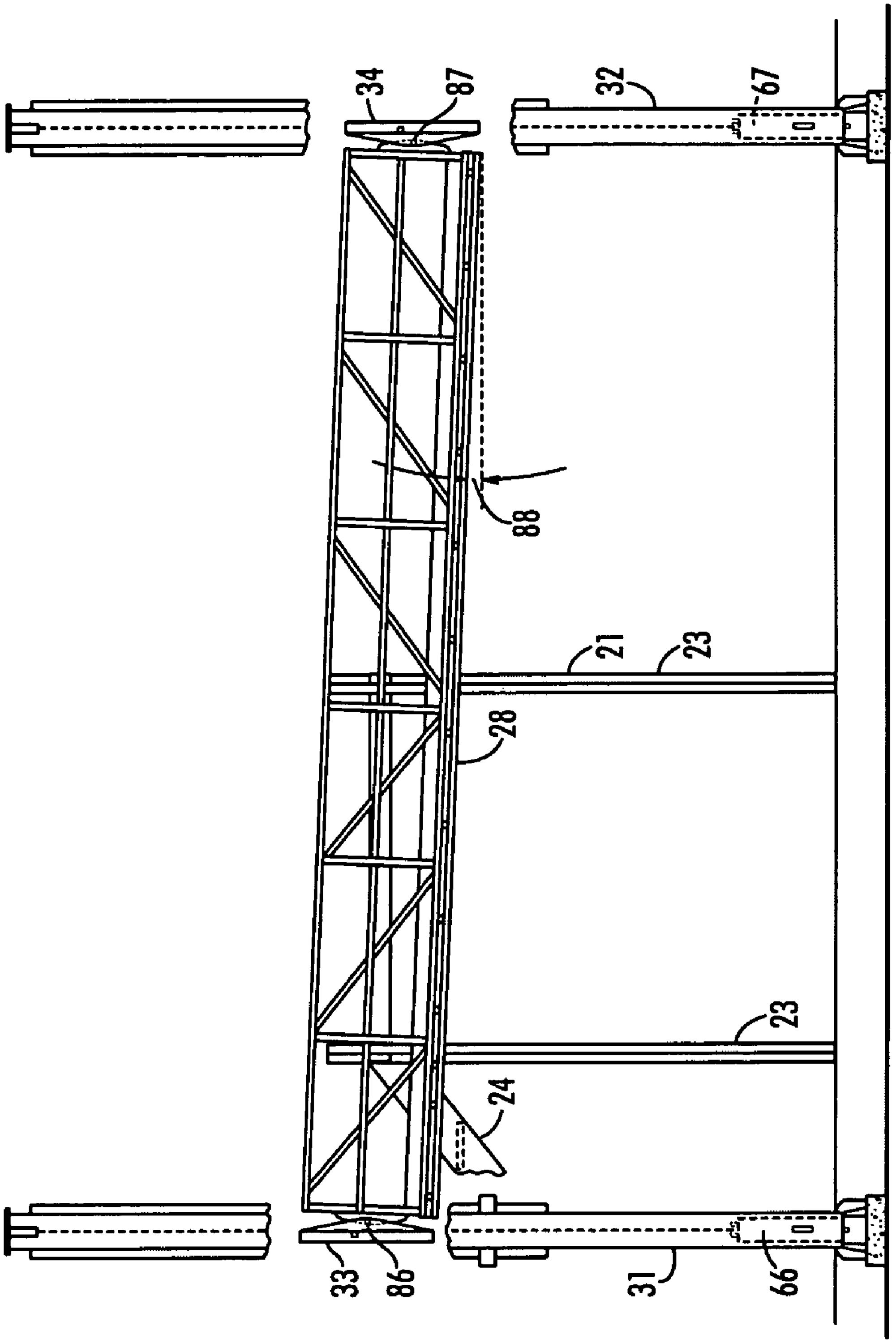
FIG. 6 is a view similar to FIG. 5 but showing the worker platform skewed to an out of level condition.
Figure 7:
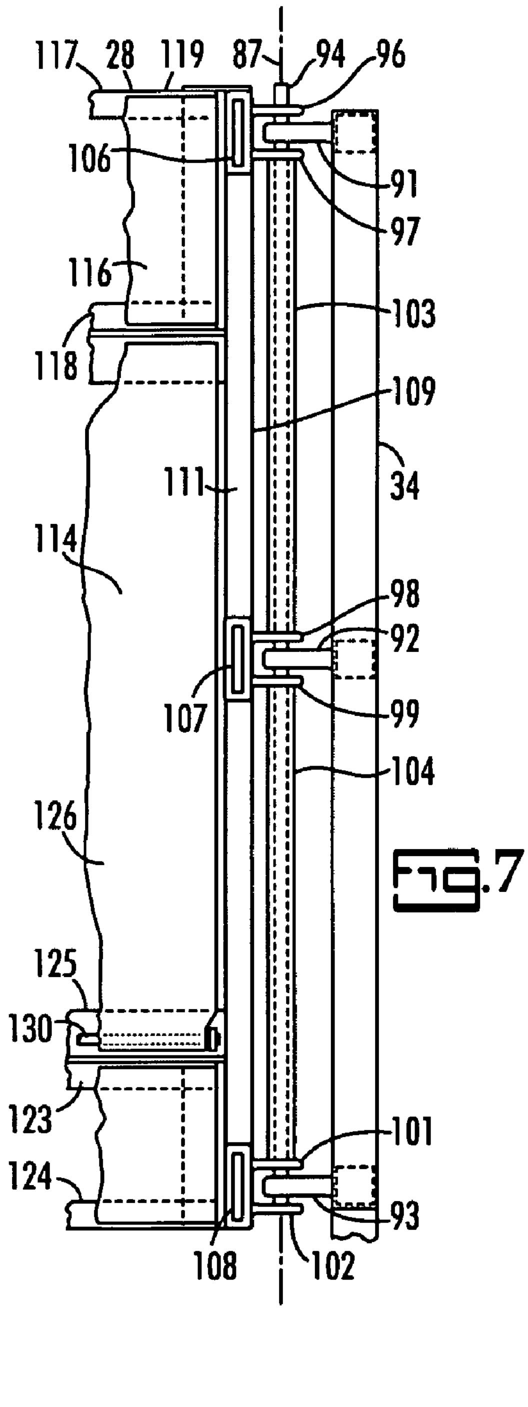
FIG. 7 is partial top view of the structure of FIG. 5 showing a horizontal pivot connection between one end of the worker platform and a cantilever support arm.

As shown in FIGS. 1 4, 5, 6 and 7 the opposite longitudinal ends of the elevatable service platform 28 are pivotally connected to the cantilever arms 33, 34 on a pair of parallel horizontal axes 86, 87 extending at right angles to the vertical plane 35. These pivot connections between the cantilever arms 33, 34 and the opposite ends of the elongated service platform 28 prevent binding of the carriage rollers on their tracks should the actuators 61, 62 get out of phase. Pressure fluid is simultaneously supplied to actuators 61, 62 via a gear type flow divider 147, shown schematically in FIG. 12, to raise and lower the arms 33, 34 and service platform 28 in unison; however, such flow dividers typically have an accuracy to within 1 to 2 percent. When the actuators 61, 62 are out of phase, the platform 28 may tilt an angle 88 to an out of level condition as shown in FIG. 6. When the angle 88 exceeds 2.5 degrees, the hereinafter described limit switches 131, 132, 133, 134 prevent further joint operation of the actuators 61, 62. The hinge connection between the cantilever arm 34 and one end of the platform 28 is shown in detail in FIG. 7. The arm 34 includes three vertically disposed ribs 91, 92, 93 pivotally connected on the axis 87 to a longitudinal end of the platform 28 by a pivot pin 94 extending through aligned openings in ribs 91, 29, 93, through aligned openings in flanges 96, 97, 98, 99, 101, 102 and through aligned bearing sleeves 103, 104. The flanges 96, 97, 98, 99, 101, 102 are welded to uprights 106, 107, 108 of an end panel portion 109 of a guard railing 111 disposed at four sides of the platform 28. The other longitudinal end of the platform 28 is pivotally connected to the cantilever arm 33 on the horizontal axis 86 in a similar manner.

The horizontal service platform 28 includes a floor 114 having a walkway 116 supported on and fixedly secured to a pair of parallel platform beams 117, 118. The walkway 116 extends along the lateral side 119 of the elongated platform 28 that is remote from the support pillars 31, 32. As shown in FIGS. 4 and 5 the guard railing 111 has an opening 112 which permits the distal end of the stairway 24 to be set down on the walkway 116 of the floor 114. The floor 114 also includes a narrow section 122 at the other lateral side of the platform 28 supported on and secured to a pair of parallel platform beams 123, 124. The floor 114 includes a doorway 125 between the beams 118, 123 covered by a plurality of side-by-side doors 126 which have first corresponding ends pivotally connected by a pin 130 to the beam 123 and opposite corresponding ends vertically supported on the beam 118, when the doors 126 are in their horizontal closed position. The doors 126 may be selectively opened by pivoting them about the horizontal axis 127 on which they are connected to the beam 123. FIG. 10 shows one of the doors 126 pivoted to an open position in which the door 126 rests against the guard railing 111.

Figure 11:
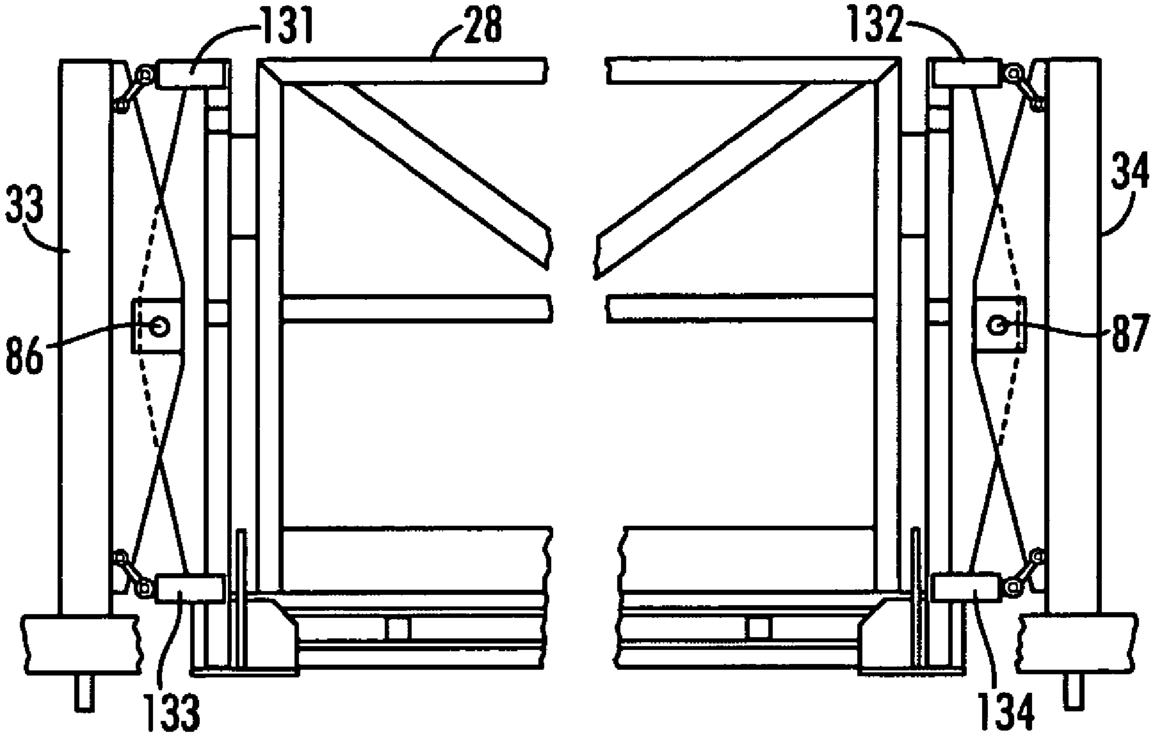
FIG. 11 is partial side view showing the hinge connections and limit switches between the platform and the cantilever arms.
Figure 12:
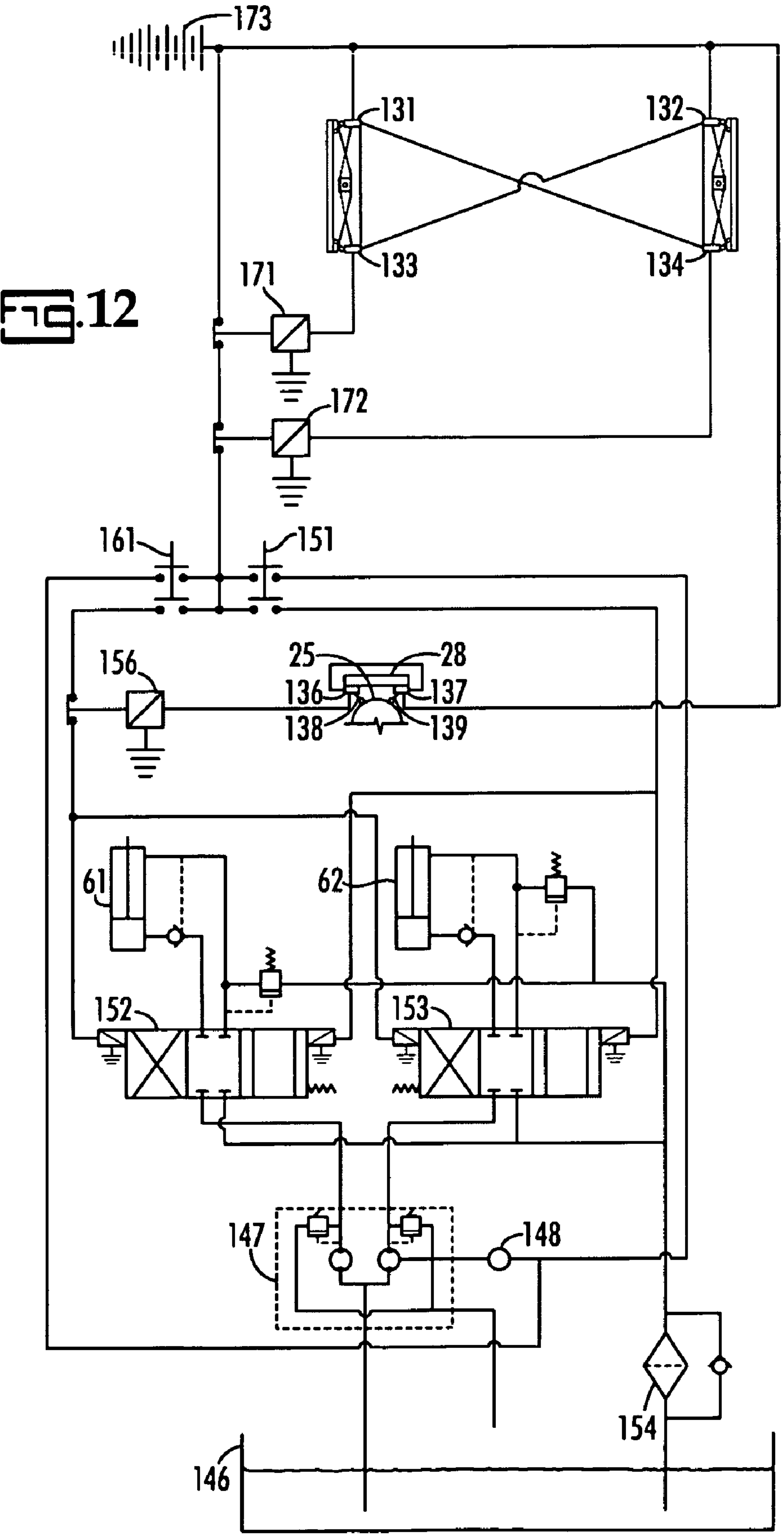
FIG. 12 is a schematic illustration of part of the control system for the vehicle access structure.

FIG. 11 shows the opposite longitudinal ends of the platform 28 pivotally connected to the cantilever arms 33, 34 on parallel horizontal axes 86, 87 and also shows upper lever operated electric switches 131, 132 and lower lever operated electric switches 133, 134 mounted on the platform 28. Referring also to FIG. 12, the switches 131, 132, 133, 134 are biased to an open position, however in their installed position with the platform 28 level they are held in their closed position. When the tilt angle 88 of the platform 28 reaches about 2.5 degrees, as illustrated in FIG. 6, the switches 131 and 134 will open to de-energize and open solenoid switch 172, thus automatically preventing fluid flow to or from the fluid power actuators 61, 62. Likewise when the platform tilts about 2.5 degrees from horizontal in the opposite direction switches 132 and 133 will open to cause solenoid switch 171 to open, thereby likewise preventing fluid flow to or from the actuator 61, 62.

Referring to FIGS. 1, 2, 3 and 12, a pair of electrical toggle limit switches 136, 137 are mounted on the underside of the platform on laterally opposite sides of the doorway 125. When the projecting operating lever 138 or 139 of one of the switches 136, 137 contacts the top of the tank of the bulk transport truck 25, the switch solenoid switch 156 is de-energized and opens thus preventing the fluid actuators 61, 62 from further lowering the platform 28.

FIG. 12 illustrates part of the control system for the fluid actuators 61, 62. Fluid is drawn from a reservoir 146 by a gear type flow divider 147 driven by electric motor 148. The flow divider 147 also functions as a pump. When a raise switch 151 is closed, electric power from a source 173 is directed to the flow divider/pump drive motor 148 and to a pair of solenoid valves 152, 153 causing their flow control elements to be moved to the left thereby supplying fluid to the piston or cylinder end of each of the fluid actuators 61, 62 and causing fluid from the rod end of the fluid actuators 61, 62 to be exhausted to the reservoir 146 via a filter 154. The platform 28 will thus be raised due to the linear extension of the fluid actuators 61, 62. The platform 28 may be lowered by closing a lower switch 161 which causes the flow control elements of the valves 152, 153 to be moved to the right thereby effecting contraction of the fluid actuators 61, 62 and lowering of the service platform 28. When the service platform 28 is lowered to such an out of level condition that either of the limit switches 136, 137 are opened the solenoid switch 156 will open, thereby preventing further lowering of the platform 28. If the actuators 61, 62 get out of phase to such an extent that the tilt angle 88 exceeds a safe amount, the switch 171 or the switch 172 will be de-energized and move to an open position, thereby preventing flow of current from the electric energy source 173 to the solenoid valves 152, 153 and the flow control elements will move to their illustrated neutral position to which they are spring biased. The valves 152, 153 will remain in their neutral position until the platform 28 is moved toward a level condition by a control system, not illustrated.

The transport vehicle access structure of this invention provides a very convenient worker platform 28 with multiple doors 126 which can be individually opened to service a selected area of the top of the tank of bulk transport vehicles 25, 25'. The unopened doors 126 are part of the worker platform floor 114, thereby increasing safety and providing space for additional workmen about the opened part doorway 125. The pivoted stairway 26 with self leveling steps, which is mounted on a stationary platform 21, is adjustable to provide safe access to the vertically adjustable platform 28. By pivoting ends of the platform 28 to the cantilever arms 33, 34, excessive binding forces on the tracks 46, 47, 55, 56 and carriage rollers are prevented. The platform 28 is prevented from being tilted more than a safe extent by a tilt sensing control.

What is claimed is:

1. A bulk material transport vehicle access structure comprising:

a pair of horizontally spaced stationary upright pillars disposed in a first upright plane, each of said upright pillars including vertical guide tracks, an elongated, horizontal service platform having longitudinally opposite ends, a pair of horizontally extending parallel cantilever arms having corresponding ends supported on said guide tracks of said pillars, respectfully, for vertical up and down movement on said pillars, said cantilever arms being disposed at right angles to said first upright plane as said service platform is raised or lowered, said pair of cantilever arms being pivotally connected, respectively, to said opposite ends of said service platform on parallel horizontal axes extending at right angles to said first upright plane, and electrically controlled power means connected to said arms operable to raise and lower said arms and said service platform simultaneously.

2. The vehicle access structure of claim 1 including lever operated electric switches operating to interrupt operation of said power means in response to said service platform moving about said axes to a predetermined out of level condition.

3. The vehicle access structure of claim 1 having an electric toggle limit switch on the underside of said platform, said toggle switch being operatively associated with said power means and including an operating lever which actuates said switch to stop lowering of said platform by said power means when said operating lever engages the top of a bulk material transport vehicle positioned beneath said platform.

4. The vehicle access structure of claim 1 wherein said pillars are hollow, and further comprising a pair counterweights reciprocally disposed within said hollow pillars, respectively, and operatively connected with said cantilever arms, respectively, to at least partially counterbalance the weight of said arms and platform.

5. The vehicle access structure of claim 1 wherein said power means includes a pair of upright linear fluid actuators having cylinders supported, respectfully, on said pillars and piston rods connected, respectfully, to said cantilever arms and wherein said pillars are hollow and further comprising counterbalancing apparatus including a pair of counterweights reciprocally positioned in said pillars, respectively, a pulley on each of said cantilever arms, a pulley on the top of each of said pillars, a first cable having one end secured to one of said counterweights and extending upwardly over said pulley at the top of a first associated pillar, then extending downwardly and around said pulley on an associated one of said arms, then extending upwardly and connecting to said top of said first associated pillar and a second cable having one end secured to the other of said counterweights and extending upwardly over said pulley at the top of a second associated pillar, then extending downwardly and around said pulley on a second associated arm, then extending upwardly and connecting to said top of said second associated pillar.

6. The vehicle access structure of claim 1 wherein said service platform has laterally opposite sides, a floor support structure including longitudinally extending support beams and, a floor supported on said beams including a walkway along one of said laterally opposite sides and a plurality of side by side horizontally disposed doors between said walkway and the other laterally opposite side of said platform, said doors on their side nearest the other lateral side of said platform being hinged to said platform on an axis extending longitudinally in relation to said platform.

7. The vehicle access structure of claim 1 and further comprising a stationary landing with an elevated floor area, fixed stairs extending to said floor area and a pivotable stairway with self leveling steps, said pivotable stairway being pivotally connected at one of its opposite ends to said landing on an axis parallel to said horizontal service platform, the other end of said stairway being positionable to afford worker access to said platform in a predetermined range of elevation of said platform for servicing the tops of bulk material transport vehicles of a predetermined range of heights.

* * * * *

UNITED STATES PATENT AND TRADEMARK OFFICE

CERTIFICATE OF CORRECTION

PATENT NO. : 7,140,467 B2

APPLICATION NO. : 10/835120

DATED : November 28, 2006

INVENTOR(S) : Anthony J. Cook

It is certified that error appears in the above-identified patent and that said Letters Patent is hereby corrected as shown below:

ON THE COVER PAGE INSERT:

(73) Assignee: Aluminum Ladder Company
Florence, SC (US)

Signed and Sealed this

Eighteenth Day of March, 2008

Jon W. Dudas

JON W. DUDAS
*Director of the United States Patent and Trademark Office*